United States Patent [19]
Hall

[11] Patent Number: 5,957,309
[45] Date of Patent: Sep. 28, 1999

[54] TRAY RACK

[76] Inventor: Donald M. Hall, P.O. Box 1548 19 Progress St., Kingston, N.Y. 12401

[21] Appl. No.: 08/704,007

[22] Filed: Aug. 23, 1996

Related U.S. Application Data

[63] Continuation of application No. 08/386,503, Feb. 10, 1995, abandoned
[60] Provisional application No. 60/002,711, Aug. 23, 1995.

[51] Int. Cl.$^6$ ....................................................... A47F 3/14
[52] U.S. Cl. .................................... 211/126.2; 211/133.1; 211/186; 280/79.3
[58] Field of Search ............................. 211/126.1, 126.2, 211/182, 186, 189, 194, 71.01, 133.1, 188; 108/91; 280/47.35, 79.3

[56] References Cited

U.S. PATENT DOCUMENTS

| | | |
|---|---|---|
| 1,691,621 | 11/1928 | Young . |
| 2,838,198 | 6/1958 | Vidal . |
| 3,141,554 | 7/1964 | Sussman et al. . |
| 3,248,077 | 4/1966 | Charles . |
| 3,332,730 | 7/1967 | Rubin et al. . |
| 3,424,315 | 1/1969 | Farren . |
| 3,533,513 | 10/1970 | Berman . |
| 3,567,039 | 3/1971 | Evans . |
| 3,912,086 | 10/1975 | de Bruyn . |
| 4,349,213 | 9/1982 | Hirsch . |
| 4,588,096 | 5/1986 | Story et al. .............................. 211/126 |
| 4,788,741 | 12/1988 | Hilborn .................................. 16/35 R |
| 4,998,023 | 3/1991 | Kitts ....................................... 211/126 |
| 5,016,765 | 5/1991 | Leonardo . |
| 5,123,550 | 6/1992 | Nodskov et al. . |
| 5,125,520 | 6/1992 | Kawasaki ................................ 211/133 |
| 5,269,112 | 12/1993 | Weinrub et al. . |
| 5,330,060 | 7/1994 | Bohner . |
| 5,330,064 | 7/1994 | Hall . |
| 5,370,239 | 12/1994 | Kidaloski et al. . |

Primary Examiner—Daniel P. Stodola
Assistant Examiner—Richard M. Smith
Attorney, Agent, or Firm—Shlesinger, Arkwright & Garvey LLP

[57] ABSTRACT

The rack includes left and right upright frames having front and rear spaced apart posts, a lower connector disposed between the left frame and the right frame, the lower connector engaging at least one of the front and rear posts, and an upper connector disposed between the left frame and the right frame. The upper connector may be free of engagement with at least one of the front and rear posts.

19 Claims, 7 Drawing Sheets

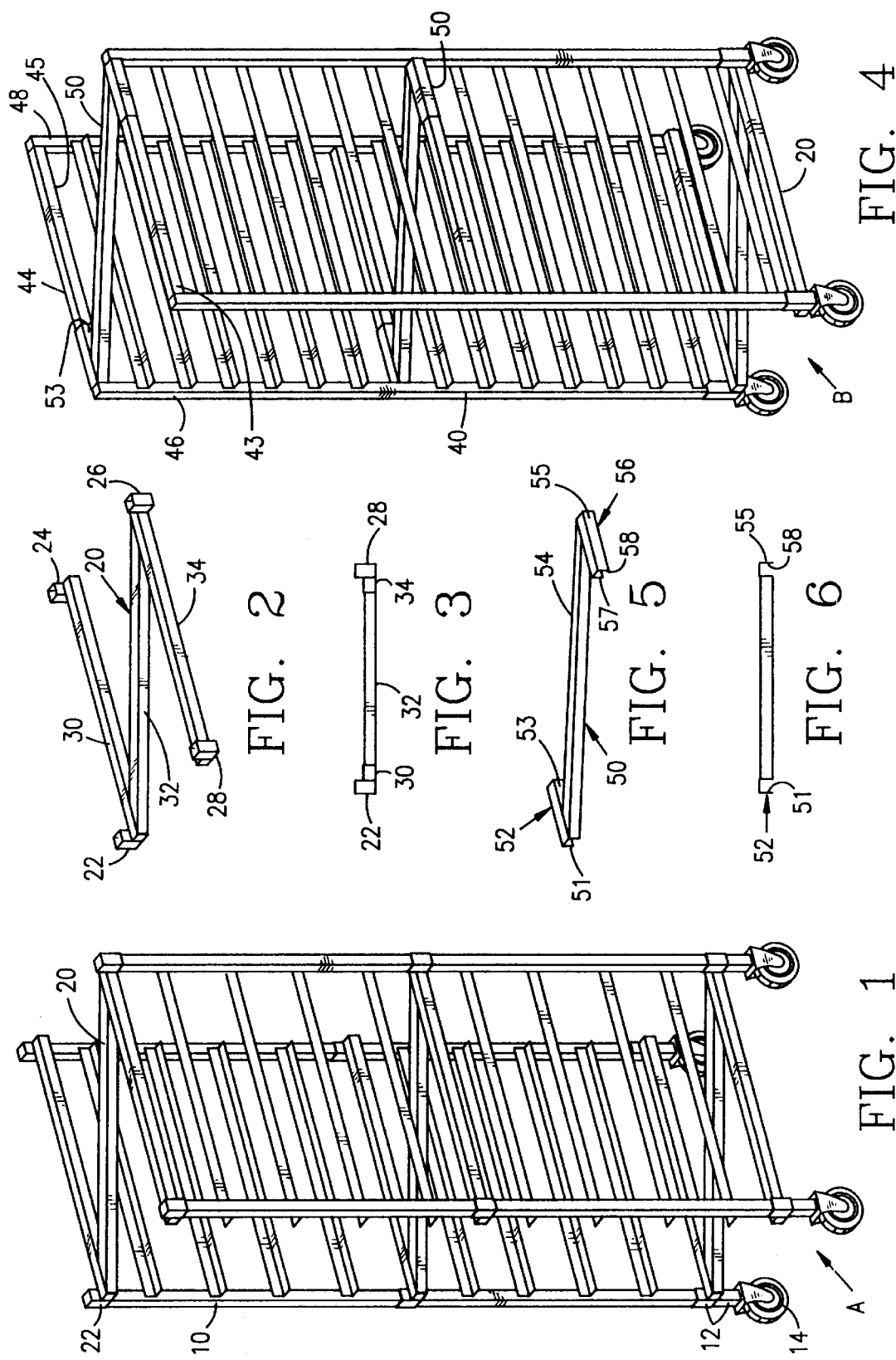

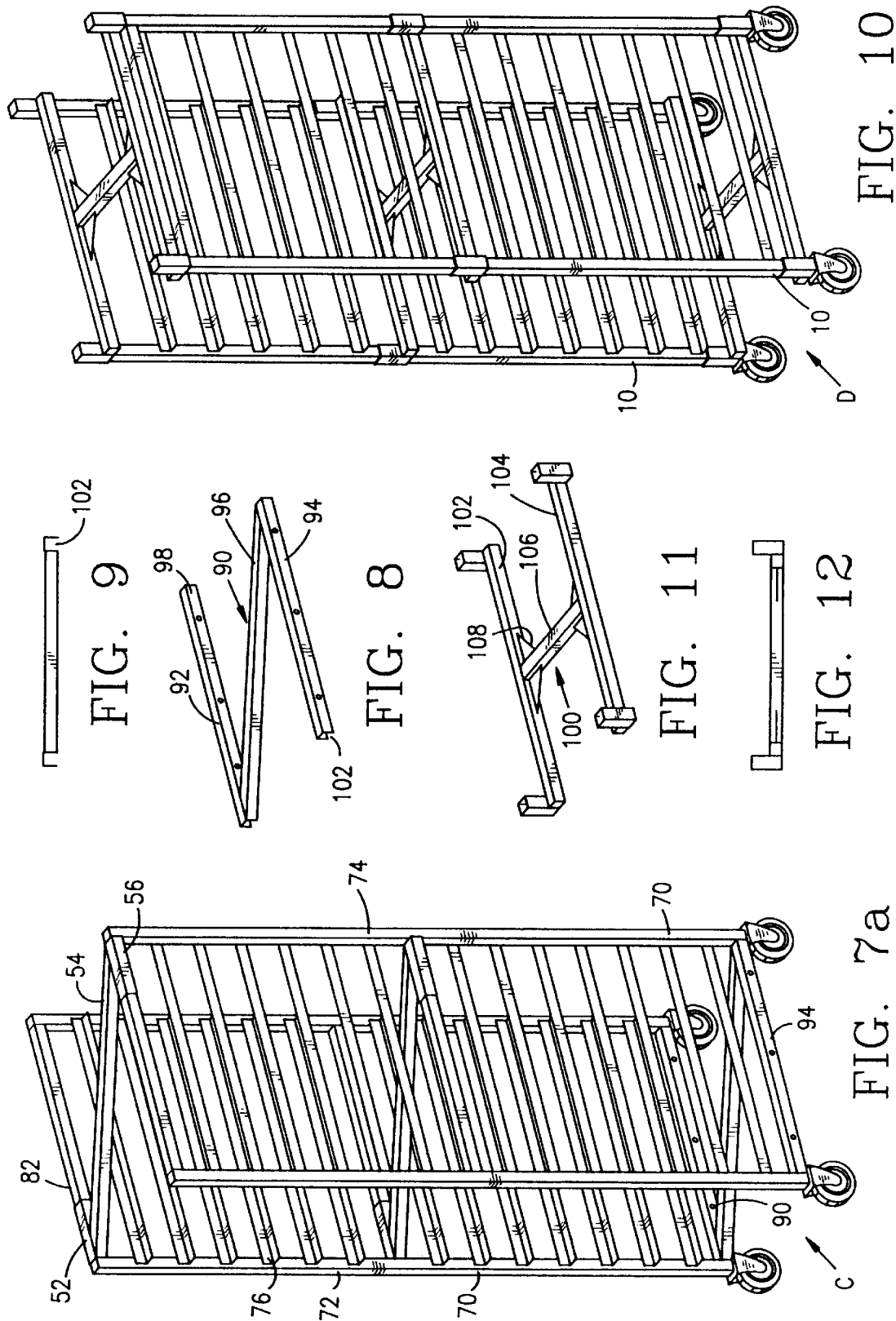

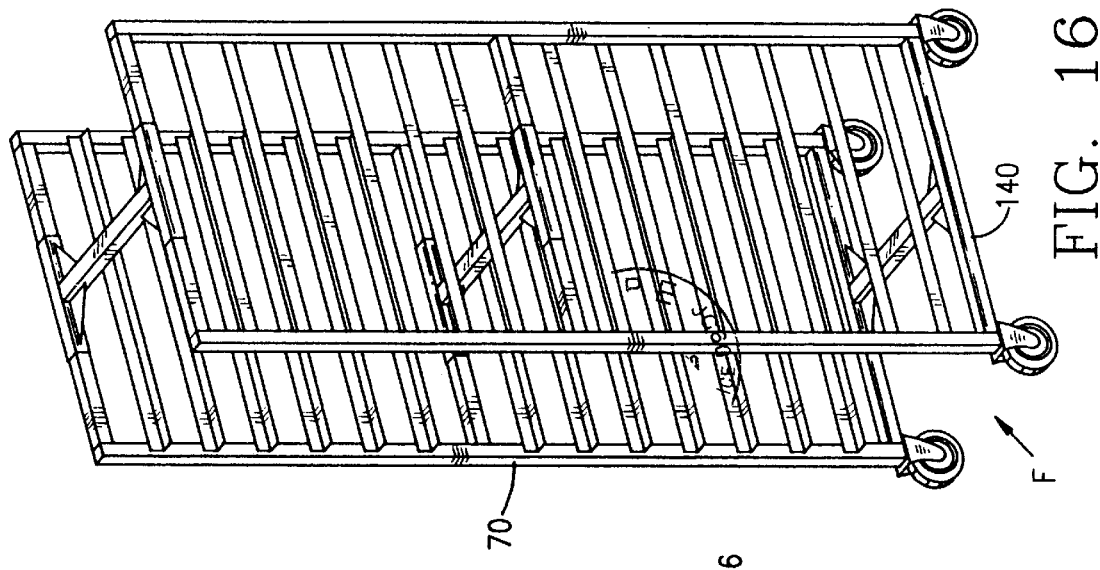
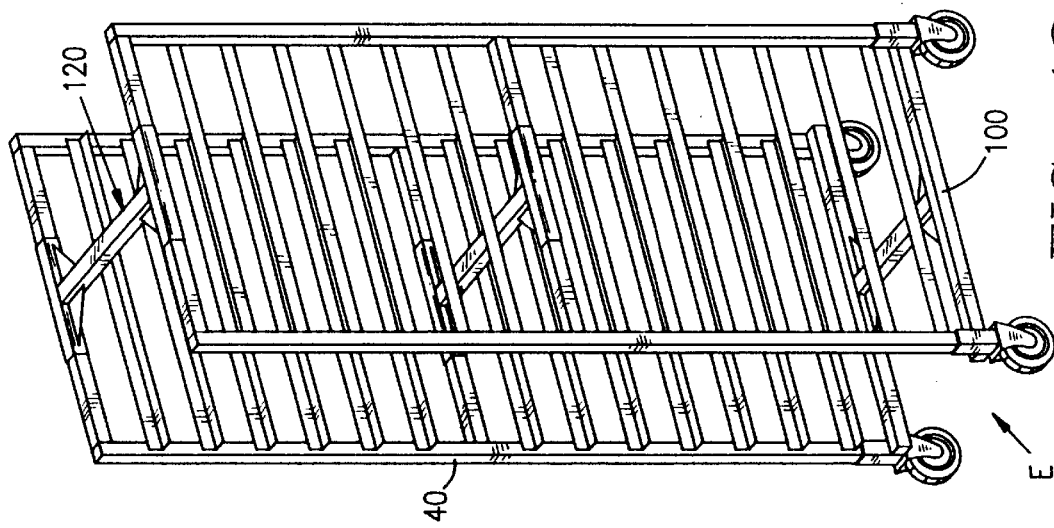

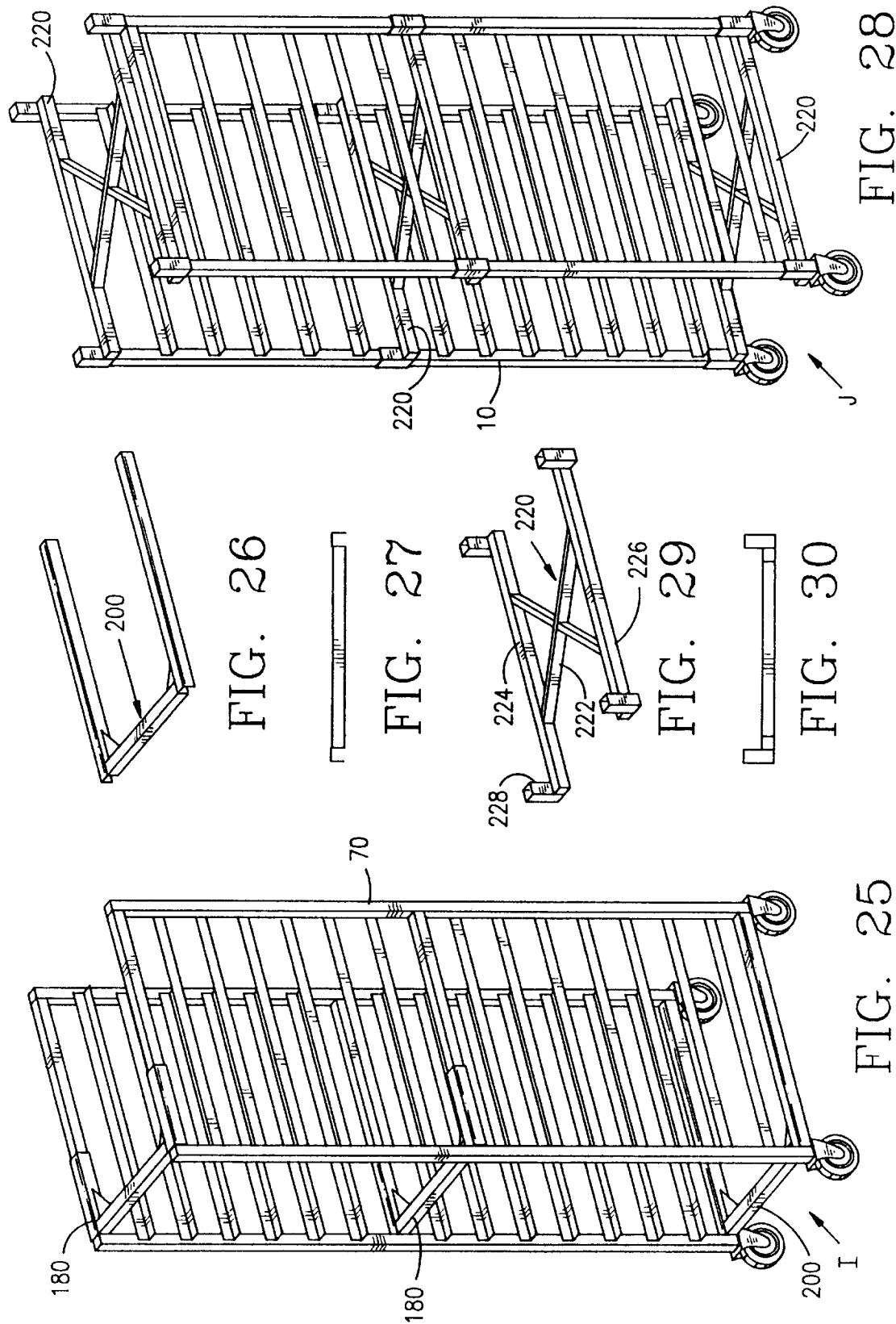

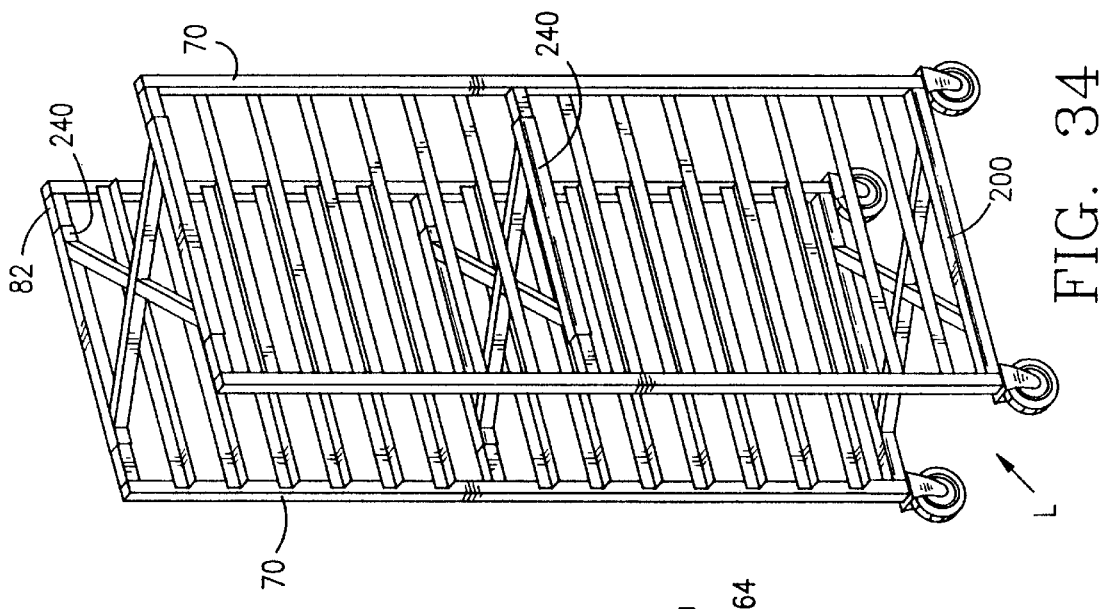
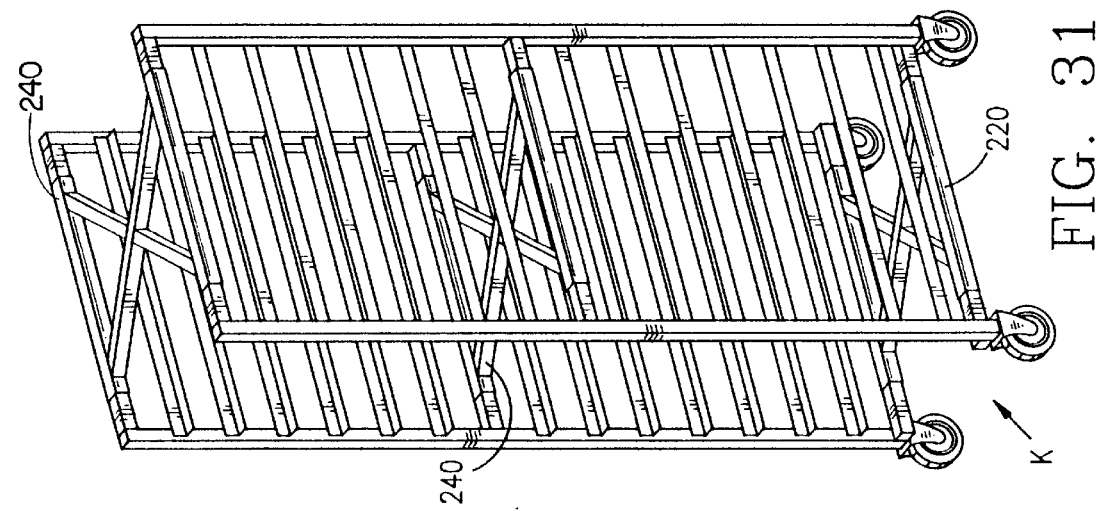

TRAY RACK

CROSS REFERENCE RELATED APPLICATIONS

This application claims the priority of Provisional Application Ser. No. 60/002,711, filed Aug. 23, 1995, and is a continuation of U.S. patent application Ser. No. 08/386,503, filed Feb. 10, 1995, now abandoned.

FIELD OF THE INVENTION

This invention relates to a rack. More particularly, this invention relates to a rack suited for holding and supporting objects that may be assembled and disassembled.

BACKGROUND OF THE INVENTION

Racks have long been used for moving supported objects from one place to another.

Known racks and frames are disclosed in, for example: U.S. Pat. No. 5,330,064 to Hall; U.S. Pat. No. 3,912,086 to de Bruyn; U.S. Pat. No. 5,330,060 to Bohner; U.S. Pat. No. 5,123,550 to Nodskov et al.; U.S. Pat. No. 5,016,765 to Leonardo; and U.S. Pat. No. 4,349,213 to Hirsch.

Known racks are frequently expensive to manufacture, unsuitable for various load and force requirements, difficult to use, often require lots of storage space, particularly in case of heavy-duty racks, and are difficult to assemble and disassemble.

OBJECTS AND SUMMARY OF THE INVENTION

Accordingly, it is an object of the invention to provide a rack which overcome the drawbacks and disadvantages of prior art devices.

Another object of the invention is to provide a rack which can be easily and inexpensively manufactured.

A still further object of the invention is to provide a rack which can be stored in less space than conventional racks.

Yet another object of the invention is to provide a rack which is strong, yet easily disassembled.

Another object of the invention is to provide a rack which is easier to use than known racks.

A still further object of the invention is to provide a rack which can be made as either an integral rack or as a knock-down rack.

Yet another object of the invention is to provide a rack which absorbs and transmits forces, such as laterally applied, vertically applied, and torsional forces, better than conventional racks.

A further object of the invention is to provide a rack which can be shipped in a disassembled condition so that shipping costs are reduced by the use of the United States Postal Service and the United Parcel Service (UPS), for example.

A still further object of the invention is to provide a holding rack which has more usable space than conventional holding racks.

A further object of the invention is to provide a holding rack stronger than known holding racks, yet which uses less expensive materials in its construction.

Another object of the invention is to provide a ladder assembly or upright frame which is simpler, easier to manufacture, easier to use, and less expensive to produce than known ladder assemblies.

It is a still further object of the invention to provide a ladder assembly or upright frame which is free of fasteners and holes, such as are common in known assemblies.

Another object of the invention is to provide a rack having various components made of different materials that are readily assembled despite the provision of close tolerances to achieve a strong rack.

In summary, therefore, the invention is directed to a rack which requires less storage space both assembled and disassembled than conventional racks, is easier to use, is strong, is cost effective, is reliable, has increased holding capacity, is inexpensive to produce and ship, and withstands forces of loading as well as external forces exerted on its upright elements better than known racks.

In one embodiment of the invention, the rack includes left and right upright frames having front and rear spaced apart posts, a lower connector disposed between the left frame and the right frame, the lower connector engaging at least one of the front and rear posts, an upper connector disposed between the left frame and the right frame, and the upper connector being free of engagement with at least one of the front and rear posts.

In another preferred embodiment of the invention the rack includes a left upright frame having a member extending between front and rear posts, a right upright frame spaced from the left upright frame, a lower connector disposed between the left frame and the right frame, an upper connector disposed between the left and right frames, the upper connector being free of engagement with at least one of the front and rear posts, and a channel member disposed on one of the upper and lower connectors for detachably engaging the member.

In yet another preferred embodiment of the invention, an upright frame or ladder assembly is provided which is free of fasteners and/or holes.

Throughout the specification, relative terms such as front and rear, and left and right, for example, are used for convenience, and are not intended to be limiting

BRIEF DESCRIPTION OF THE DRAWINGS

FIG. 1 is a perspective view of a rack along the lines disclosed in U.S. Pat. No. 5,330,064;

FIG. 2 is a perspective view of a z-shaped frame for use with the rack A of FIG. 1;

FIG. 3 is an elevational view of the z-shaped frame of FIG. 2;

FIG. 4 is a perspective view of a rack B according to a preferred embodiment of the invention;

FIG. 5 is a perspective view of a z-shaped frame for use with the embodiment of FIG. 4;

FIG. 6 is an elevational view of the z-shaped frame of FIG. 5;

FIG. 7a is a perspective view of a preferred embodiment of a rack C according to the invention;

FIG. 8 is a perspective view of a z-shaped frame for use with the embodiment of FIG. 7;

FIG. 9 is an elevational view of the z-shaped frame of FIG. 8;

FIG. 10 is a perspective view of a preferred embodiment of a rack D according to the invention;

FIG. 11 is a perspective view of an h-shaped frame for use with the embodiment of FIG. 10;

FIG. 12 is an elevational view of the h-shaped frame of FIG. 11;

FIG. 13 is a perspective view of a rack E according to a preferred embodiment of the invention;

FIG. 14 is a perspective view of an h-shaped frame for use with the embodiment of FIG. 13;

FIG. 15 is an elevational view of the h-shaped frame of FIG. 14;

FIG. 16 is a perspective view of a rack F according to a preferred embodiment of the invention;

FIG. 17 is a perspective view of an h-shaped frame for use with the preferred embodiment of FIG. 16;

FIG. 18 is an elevational view of the h-shaped frame of FIG. 17;

FIG. 25 is a perspective view of a rack I according to a preferred embodiment of the invention;

FIG. 26 is a perspective view of an unshaped frame for use with the preferred embodiment of FIG. 25;

FIG. 27 is an elevational view of the u-shaped frame of FIG. 26.

FIG. 28 is a perspective view of a preferred embodiment of a rack J according to the invention;

FIG. 29 is a perspective view of an x-shaped frame for use with the embodiment of FIG. 28;

FIG. 30 is an elevational view of the x-shaped frame of FIG. 29;

FIG. 31 is a perspective view of a rack K according to a preferred embodiment of the invention;

FIG. 32 is a perspective view of an x-shaped frame for use with the embodiment of FIG. 31;

FIG. 33 is an elevational view of the x-shaped frame of FIG. 32;

FIG. 34 is a perspective view of a rack L according to a preferred embodiment of the invention;

FIG. 35 is a perspective view of an x-shaped frame for use with the preferred embodiment of FIG. 34;

FIG. 36 is an elevational view of the x-shaped frame of FIG. 35.

DETAILED DESCRIPTION OF THE INVENTION

Figure 7B:
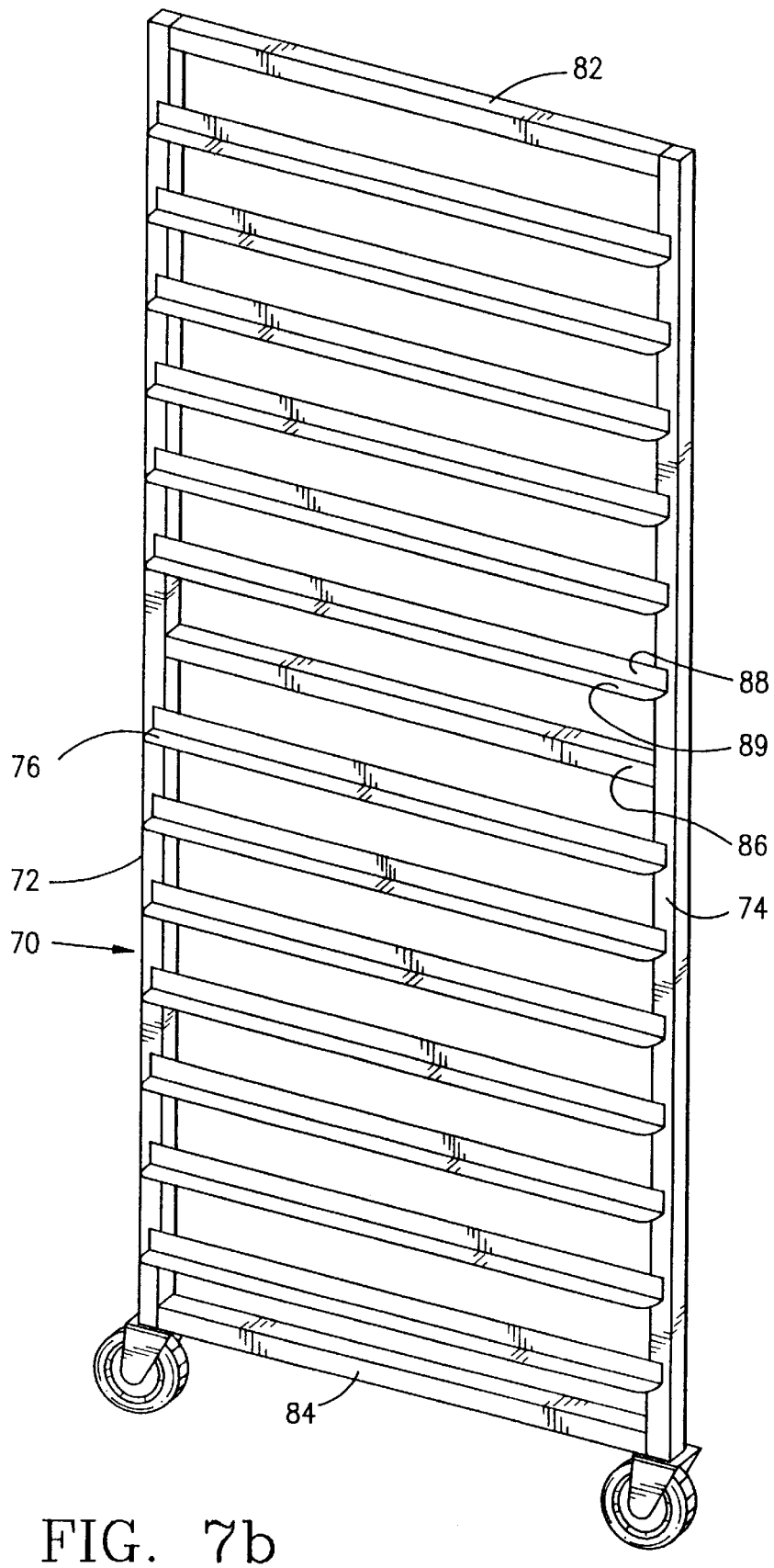
FIG. 7b is a perspective view of a ladder assembly or upright frame according to the invention.

Turning to FIGS. 1–3, a rack A is shown that is along the lines described in my earlier U.S. Pat. No. 5,330,064, which is incorporated herein by reference.

Rack A includes an upright frame or ladder assembly 10 having extensions 12 at the free ends thereof. Typically a pair of ladders 10 are provided, as illustrated, each having wheels, such as the illustrated casters 14 which may be made in accordance with U.S. Pat. No. 5,330,064, discussed above.

A z-shaped frame 20 includes sockets 22, 24, 26 and 28 which are sized so as to fit over free ends 12 of racks 10. A structural element 30 extends between sockets 22 and 24, a structural element 32 extends between sockets 22 and 26, and a structural element 34 extends between sockets 26 and 28.

Such structural elements may be made of square tubing, for example.

Z-shaped frame 20 may be attached to the two upright frames 10, such as by the use of bolts extending through one or more sockets 22, 24, 26, and 28, as described in U.S. Pat. No. 5,330,064.

FIG. 4 illustrates a preferred embodiment of the invention in which a rack B includes a pair of upright frames 40 having a structural member 44 (having an outer face 43 and an inner face 45), such as square tubing, c-channels, and the like, extending between a front post 46 and a rear post 48.

FIGS. 5 and 6 show details of a z-shaped frame or connector 50 having a left leg 52 and a right leg 56. Left and right legs 52, 56 may be made of c-channels, u-channels, and/or l-channels, for example. These channel or channel members 50 may include a downwardly extending portion 58 for extending over and engaging the structure members of upright frames 40.

Left leg 52 has a left outer extension 51 and a left inner extension 53. Right leg 56 has a right outer extension 55 and right inner extension 57. Right outer and inner extensions 55, 57 may extend downwardly as shown in FIGS. 4–6, and may collectively be termed the downwardly extending portion 58 described above.

Good results have been achieved when left and right legs 52, 56 had a length less than half the length of member 44 of upright frame 40.

Thus, it will be seen that rack B includes the z-shaped frame 20 of FIG. 2 at the bottom of rack B, with a pair of z-shaped frames 50 of FIG. 5 located at the middle and top of rack B.

FIG. 7a shows another preferred embodiment of a rack C according to the invention.

Rack C includes a ladder assembly or upright frame 70, as best seen in FIG. 7b. Upright frame 70 includes a rear post 72 and a front post 74 with a support member 76 extending therebetween.

An upper structural member 82 extends between upper portions of front and rear posts 74, 72. Likewise, a lower structural member 84 extends between posts 72 and 74. Posts 72 and 74, and members 82 and 84 are typically rigidly joined together in order to form the basic supporting structure of upright frame 70.

Typically, a middle structural member 86 will be disposed between upright posts 72 and 74 to enhance the rigidity of frame 70.

Element 76 may be made in the form of a standard l-shaped structural angle member having an upright face 88 and a lower face 89 extending therefrom Outer ends of upright face 88 will typically be attached to posts 72 and 74 to further rigidify frame 70. Lower faces 89 serve to support objects, such as tray T, carried on rack C.

FIGS. 8 and 9 show another embodiment of a z-shaped frame or connector 90 having left and right legs 92 and 94 connected by element 96.

One or more holes 98 may be provided in members 92 and 94, as shown.

When z-frame 90 is in place at the bottom of rack C, as shown in FIG. 7a, such holes 98 will align with respective holes in the mating element, such as structural element 84, as will be appreciated. Nuts and bolts or rivets, for example, will then be used to secure members 92 and 94 to respective ones of elements 84 on the paired upright frames 70. The Z-shaped frame or connector 90 may also include a downwardly extending portion 102 for extending over and engaging the structural elements 84 or upright frames 70.

FIG. 10 shows a rack D according to a preferred embodiment of the invention that may be constructed with a pair of uprights 10, such as described in connection with FIG. 1. In that case, one will use an h-shaped frame 100 for connecting the paired frames 10 and forming a rigid structure As best seen in FIGS. 11 and 12 h-shaped frame 100 includes a left leg 102, a right leg 104, and a structural element 106 extending therebetween. One or more gussets 108 may be provided to strengthen the connection between element 106 and legs 102 and 104, as shown.

A rack E is shown in FIG. 130 Rack E may include a pair of uprights secured together by an h-shaped frame or connector 120 as shown in FIGS. 14 and 15 for connecting middle and upper portions thereof. Z-shaped frame 100 may be used to rigidify the bottom portion of rack E. One feature of h-shaped frame 120 is that one or both of the left leg 122 and right leg 124 may be provided with a length less than the length of member 82.

FIG. 16 illustrates a further rack F according to the invention.

Rack F includes an h-shaped frame having legs 142 and 144 which will typically be made substantially the same length as the width of each of the paired racks 70.

H-shape frame may be used only in the lowermost position, as shown, where the greatest forces are typically encountered, or in the middle position and upper position as well. As illustrated, h-shape frames of FIG. 14 occupy the middle and upper positions of rack F.

Figure 20:
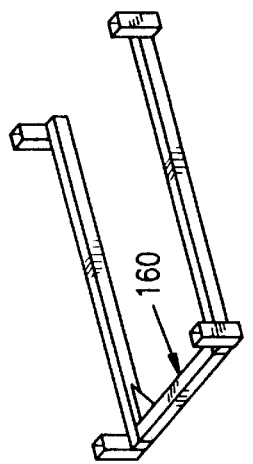
FIG. 20 is a perspective view of an u-shaped frame for use with the embodiment of FIG. 19.
Figure 21:
FIG. 21 is an elevational view of the u-shaped frame of FIG. 20.
Figure 19:
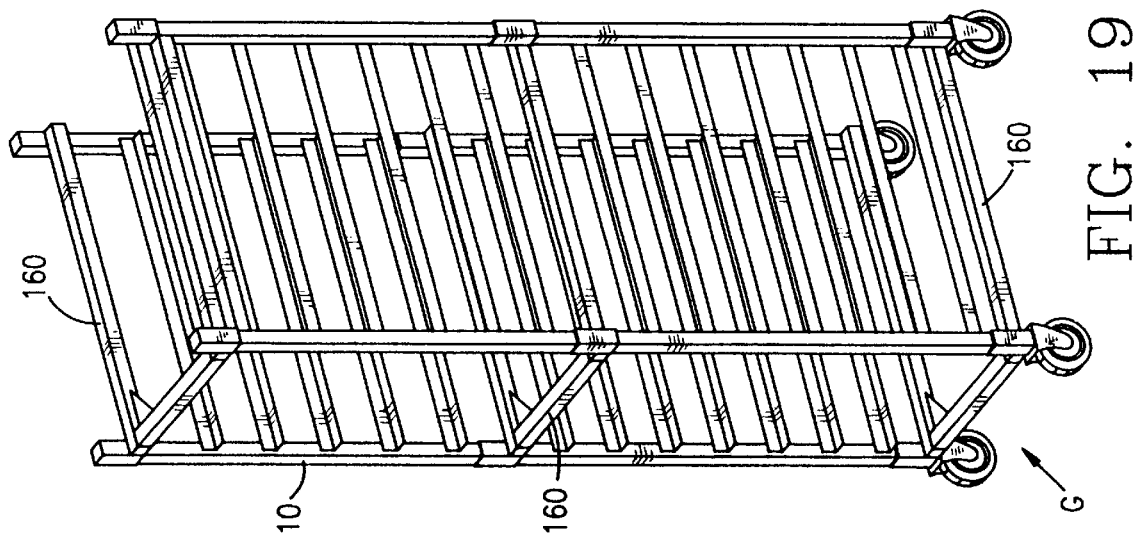
FIG. 19 is a perspective view of a preferred embodiment of a rack G according to the invention.

FIG. 19 shows a rack G according to the invention that may be built with paired uprights 10 joined by a u-shaped frame or connector 160, as further shown in FIGS. 20 and 21. Frames 160 are used to secure the upper, middle, and lower portions of rack G.

Figure 22:
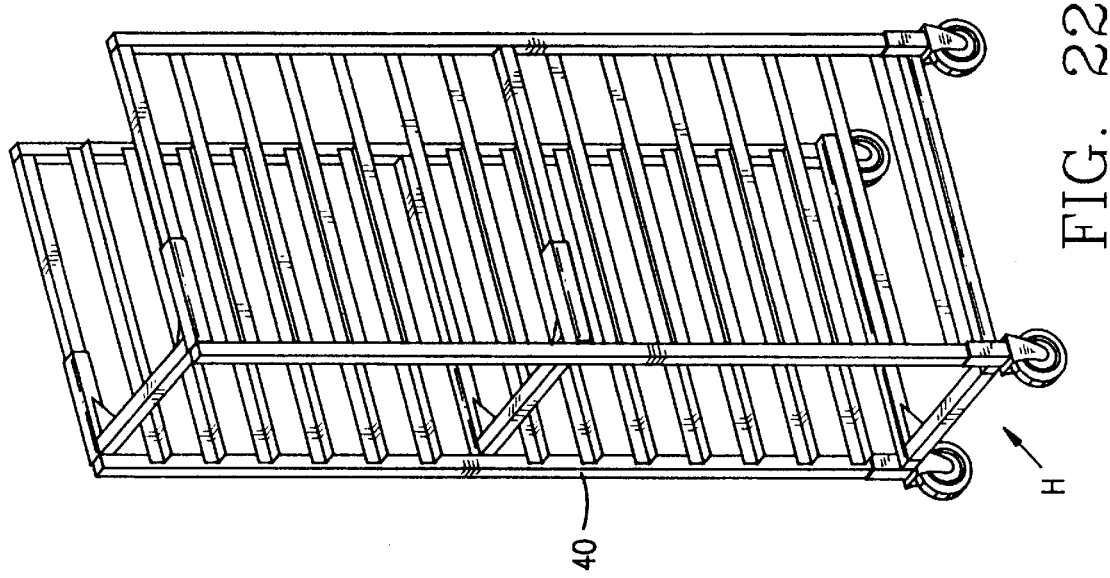
FIG. 22 is a perspective view of a rack H according to a preferred embodiment of the invention.

Another rack H is shown in FIG. 22.

Figure 23:
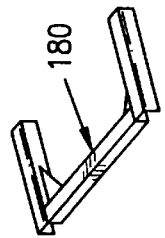
FIG. 23 is a perspective view of an u-shaped frame for use with the embodiment of FIG. 22.
Figure 24:
FIG. 24 is an elevational view of the u-shaped frame of FIG. 23.

Rack H includes paired upright frames joined by u-shaped frame 160 at a lower portion thereof, and one or more u-shaped frames 180, as likewise shown in FIGS. 23 and 24.

FIG. 25 illustrates a rack I which may be made with a pair of frames 70, for example, joined together by a u-shaped frame 200 as detailed in FIGS. 26 and 27, along with one or more u-shaped frames 180 of FIG. 23 at middle and upper positions, for example.

FIG. 28 shows a perspective of a rack J according to the invention.

Rack J may be constructed using paired uprights 10 joined together by an x-shaped frame 220 shown in greater detail in FIGS. 29 and 30.

X-shaped frame 220 includes a cross brace 222 joining together a left leg 224 to a right leg 226. One or more sockets 228 may be provided, as required FIG. 31 illustrates a rack K in which a lower portion thereof is joined together by x-shape frame 220, and the middle and upper portions thereof are joined together by an x-shaped frame 240 best seen in FIGS. 32 and 33.

One or both of a left leg 242 and a right leg 244 may extend about the width of connecting element 246.

In use, as shown in FIG. 31, the length of leg 242 and/or 244 may be substantially less than the width of the upright frame to which it is attached.

A rack L is shown in FIG. 34. Rack L may be constructed using a pair of uprights 70 joined together by an x-shaped frame 260, as illustrated in greater detail in FIGS. 35 and 36. Bracket 260 includes a left leg 262 and a right leg 264, each of which may be substantially as long as structural members 82 and 84 of upright frame 70. The top and middle of rack L may be rigidified by use of x-frames 240, and the bottom may be rigidified by use of x-frame 260.

OPERATION

Rack A may be constructed along the lines described in U.S. Pat. No. 5,330,064, as described above, with the addition of the ladder assemblies 10 for holding trays and other objects, for example.

Rack B, as shown in FIG. 4, may be constructed with a z-shaped frame 20 at the lower portion thereof, which has been bolted to extensions 12, as shown in FIG. 1, which extensions 12 may terminate substantially within the mating sockets 44, as illustrated. Bolts may be inserted through one or both sides of sockets 44 to further ensure that rack B maintains its integrity. In addition, z-shaped frames 50 may be used at the middle and upper portions of rack B by inserting members 44 into the u-shaped legs 52 and 56, as illustrated.

No fasteners are required under light-duty conditions.

If desired, one may put an adhesive on the inside of legs 52 and 56 prior to insertion of members 44 to reduce the possibility that z-shaped frame 50 loosens during use.

Given close tolerances between members 44 and legs 52, 56, such adhesive would be unnecessary.

Rack C employs upright frames or ladder assemblies of FIG. 7b, along with z-shaped frame 90 of FIG. 8, and z-shaped frame 50 of FIG. 5. Legs 92 and 94 may be bolted to respective members 84 of frames 70, as shown, by inserting bolts through holes 98 and matching holes that have been formed in members 84. The two (2) z-shaped frames 50 may be attached as described regarding rack B.

Frames 50 may be adhered or otherwise attached to members 82, such as by the use of rivets.

Z-shaped frame 90 may likewise be made free of holes, and a pair of frames 70 free of holes, as shown, may be used. In that case, both illustrated z-shaped frame 50 and z-shaped frame 90 at the bottom of rack C may all be adhered to racks 70, or press fit to respective members 82, 86 and 84 of rack 70 of FIG. 7b.

Typically, at least z-shaped frame 90 will be fixedly attached to rack C, such as by the use of fasteners.

It is likewise contemplated that a rack be constructed using two or more racks 90 of FIG. 80

In use, one typically inserts tray T, as shown in FIG. 7a.

Other uses and the use of other types of upright frames are contemplated.

The assembly and use of racks D, E , F, G, H, I, J, K, and L will be carried out in a similar fashion. It is contemplated that each of the illustrated frames 20, 50, 90, 100, 120, 140, 160, 180, 200, 220, 240, and 260 will be used in each of the upper, middle, and lower illustrated positions on the various racks, thereby forming a variety of unillustrated racks within the scope of the invention. The use of the various frames, such as frames 50, 120, 180, and 240, for example, having legs shorter than the width of the upright frames to which they are attached, reduces the weight of the racks on which they are used, reduces the shipping weight of the racks, and reduces the overall cost of productions. In addition, the shorter legs make the racks easier to clean under certain conditions.

It is further contemplated that the fastener-free and hole-free rack 70 be used in its illustrated condition by the use of u-channels as the legs of the various z-shaped, i-shaped, u-shaped, and x-shaped frames, as shown, yet with even longer extensions of the u-channels so that, when assembled, the free, downwardly extending legs of the u-channels extend past the lower portions of members 82, 86, and 84. In that manner, bolts or rivets may be attached only to the u-channels themselves, and no mating holes need be made in members 82, 86, and 84. In that manner, a nut and bolt, for example, extending through such holes in the downwardly extending legs of the u-channels can be tightened sufficiently so as to draw the two downwardly extending legs of the u-channels together and clamp members 82, 86, and 84 therebetween, respectively It is contemplated that the racks will be constructed of various materials, such as stainless steel, aluminum, and composites.

It is further contemplated that all joints and connections will be made as fixed or detachable joints, with or without additional gussets and/or brackets, as will be readily apparent.

It is contemplated that the ladder assemblies themselves will be made of synthetic materials, and the connecting frame (e.g., z-shaped frames, h-shaped frames) will be made of aluminum.

Preferably, the ladder assemblies will be made of aluminum, and the connecting frame will be made of stainless steel.

While this invention has been described as having a preferred designs, it is understood that it is capable of further modification, uses and/or adaptations of the invention following in general the principle of the invention and including such departures from the present disclosure as come within the known or customary practice in the art to which to invention pertains and as may be applied to the central feature hereinbefore set forth, and fall within the scope of the invention and of the limits of the appended claims.

What is claimed is:

1. A rack, comprising:
   a) a left upright frame;
   b) said left upright frame including a front post, a spaced apart rear post, and a member disposed between said front and rear posts;
   c) a right upright frame spaced from said left frame, said right upright frame including a front post, a spaced apart rear post, and a member disposed between said front and rear posts;
   d) said member of said left upright frame having an outer face facing away from said right upright frame and an inner face facing towards said right upright frame;
   e) a lower connector disposed between said left frame and said right frame for connecting lower portions thereof;
   f) said lower connector including at least one structural element having a plurality of sockets thereon, each one of said plurality of sockets being configured for receiving one of said front and rear posts of said left and right upright frames;
   g) an upper connector disposed between said left frame and said right frame for connecting upper portions thereof;
   h) at least one of said upper and lower connectors including a U-channel member disposed thereon;
   i) said U-channel member including an outer downwardly extending extension configured for engaging said outer face of said member of said left upright frame, said outer downwardly extending extension extending over and engaging said outer face; and
   j) said U-channel member including an inner downwardly extending extension configured for engaging said inner face of said member of said left upright frame, said inner downwardly extending extension extending over and engaging said inner face.

2. A rack as defined in claim 1, wherein:
   a) said lower connector includes a Z-shaped frame.
3. A rack as defined in claim 1, wherein:
   a) said upper connector includes a Z-shaped frame.
4. A rack as defined in claim 3, wherein:
   a) said Z-shaped frame engages said left upright frame along about half the length of said member of said upright frame.
5. A rack as defined in claim 1, wherein:
   a) said lower connector includes an H-shaped frame.
6. A rack as defined in claim 1, wherein:
   a) said lower connector includes a U-shaped frame.
7. A rack as defined in claim 1, wherein:
   a) said lower connector includes an X-shaped frame.
8. A rack as defined in claim 1, wherein:
   a) said upper connector includes an H-shaped frame.
9. A rack as defined in claim 8, wherein:
   a) said H-shaped frame engages said left upright frame along about half the length of said member of said left upright frame.
10. A rack as defined in claim 1, wherein:
    a) said upper connector includes a U-shaped frame.
11. A rack as defined in claim 10, wherein:
    a) said U-shaped frame engages said left upright frame along about half the length of said member of said left upright frame.
12. A rack as defined in claim 1, wherein:
    a) said upper connector includes an X-shaped frame.
13. A rack as defined in claim 12, wherein:
    a) said X-shaped frame engages said left upright frame along about half the length of said member of said left upright frame.
14. A rack as defined in claim 1, wherein:
    a) a fastener attaches said lower connector to at least one of said front and rear posts.
15. A rack as defined in claim 1, wherein:
    a) an adhesive is disposed between said upper connector and at least said left frame.
16. A rack as defined in claim 1, wherein:
    a) at least one wheel is disposed on a lower portion of said rack.
17. A rack as in claim 1, wherein:
    a) said lower connector is permanently attached to said left upright frame and right upright frame.
18. A rack as defined in claim 1, wherein:
    a) said outer downwardly extending extension engages said outer face of said member of said left upright frame along about half the length of said member.
19. A rack as defined in claim 1, wherein:
    a) said outer and inner faces of said member of said left upright frame extend substantially vertically; and
    b) said outer and inner downwardly extending extensions of said U-channel member extend substantially vertically.

* * * * *